United States Patent [19]

Colson

[11] 4,450,027
[45] May 22, 1984

[54] METHOD AND APPARATUS FOR FABRICATING HONEYCOMB INSULATING MATERIAL

[76] Inventor: Wendell B. Colson, 1611 Belero St., Broomfield, Colo. 80020

[21] Appl. No.: 406,319

[22] Filed: Aug. 9, 1982

[51] Int. Cl.³ .......................................... B29C 17/00
[52] U.S. Cl. .................................. 156/193; 156/197; 156/200; 156/291; 264/285; 428/116; 428/188
[58] Field of Search ............... 156/197, 548, 494, 495, 156/291, 184, 187, 193, 190-192, 189, 446, 457, 458, 200; 428/188, 116; 242/67.5, 75.5, 75.51, 75.3; 264/285

[56] References Cited

U.S. PATENT DOCUMENTS

| | | | |
|---|---|---|---|
| 3,164,507 | 1/1965 | Masuda | 156/197 |
| 3,281,516 | 10/1966 | Southwick | 264/285 |
| 3,416,051 | 12/1968 | Pinto et al. | 242/75.51 X |
| 3,963,549 | 6/1976 | Rasmussen | 156/193 |
| 4,019,554 | 4/1977 | Rasmussen | 428/188 UX |
| 4,242,161 | 12/1980 | Hulten et al. | 156/197 |
| 4,288,485 | 9/1981 | Suominen | 156/291 X |
| 4,346,132 | 8/1982 | Cheng et al. | 428/188 X |

FOREIGN PATENT DOCUMENTS 988064  4/1965  United Kingdom ............... 156/197

*Primary Examiner*—David A. Simmons
*Attorney, Agent, or Firm*—Young & Martin

[57] ABSTRACT

The method and apparatus for fabricating honeycomb expandable insulation panels disclosed herein includes a method and apparatus for folding a continuous thin film of flexible plastic material into a uniform, open faced tubular configuration and for heat setting the folds in permanent sharp creases. It also includes a rotatable rack apparatus for continuously stacking successive lengths of the tubular formed plastic film one on top of another on flat surfaces and adhering them together in the form of a neat, uniform expandable panel of interior honeycomb cell configuration.

20 Claims, 15 Drawing Figures

METHOD AND APPARATUS FOR FABRICATING HONEYCOMB INSULATING MATERIAL

BACKGROUND OF THE INVENTION

The present invention is related to movable insulation, and more specifically to a method and apparatus for fabricating expandable honeycomb insulation panels of a flexible thin film plastic material and the product produced according to such method.

With the advent of the energy shortages experienced over the last decade, there has been a renewed interest in energy conservation applications related to heat gains and losses through poorly insulated wall areas, such as windows and the like. One of the basic tenents of passive solar energy saving designs for building is that large generally south facing windows can be used to gain heat during sunny winter days. However, large windows are also responsible for heat loss during cold winter nights due to re-radiation of the heat from the interior of the house through the windows to the colder exterior. On the other hand, during hot summers, it is desirable to keep the heat from the sunlight during the day out of the interior of the house and to allow the heat in the house to radiate to the outside during the nights. Therefor, in order to take optimum advantage of the heating and cooling cycles of the sun or absence thereof during day and night periods, it is necessary to be able to move insulation in place over the windows or to retract it at appropriate times to allow the transfer of heat therethrough or to prohibit the transfer of heat therethrough as desired. This need for movable insulation panels has resulted in a renewed interest in the use of honeycomb structured panels for movable insulation purposes since they contain numerous individual dead air space cells and are readily expandable and contractable. However, it is also necessary to have a material that reflects sunlight and is able to maintain its effectiveness, shape, structural rigidity and appearance through wide ranging temperature variations and over long periods of use. During hot summer days when the panel is in place over the window, temperatures can reach well over 100 degrees F. Alternately, on cold winter nights, the temperatures can be quite low.

In other kinds of movable insulation structures, it has been found that a thin film polyester plastic material, commonly known by the trademark Mylar, has suitable characteristics for movable insulation applications. It can withstand the temperature variations required, reflective coatings can be applied on the surfaces thereof, it has the required longevity, and it is relatively inexpensive. However, past efforts to fabricate honeycomb movable insulation panels from thin film polyester or Mylar material have left much to be desired. For example, it has been found to be quite difficult to fabricate on a mass production basis clean cut, uniform and neat appearing panels with no wrinkles or warps to detract from the appearance thereof or to interfer with the insulating function of the panels. Further, mechanical folds and creases in the plastic film tend to lose their sharpness and sag or become rounded over time. The failures are particularly troublesome when the material is subject to high temperatures during hot summer applications, since the molecular bias of the plastic film material is toward the flat configuration of which is was manufactured. Prior attempts to set the folds or creases on the edges by pressure and by heating have not been successful because these methods cause internal stresses that result in warps and wrinkles. Further, prior art attempts at stacking adjacent tubular layers of the thin film plastic material to form the panels have also been generally unsatisfactory in that they result in wrinkles and warps, and uneven lines. Some prior attempts have also included exceedingly cumbersome machinery having many strips of material running simultaneously.

SUMMARY OF THE INVENTION

Accordingly, it is an object of the present to provide a method and apparatus for fabricating expandable and contractable honeycomb panels that are long lasting, relatively inexpensive, and have a neat, clean cut appearance with no wrinkles or warps that detract from the appearance or interfer with the function thereof.

It is also an object of the present invention to provide an expandable and contractable honeycomb movable insulation panel fabricated with a thin film polyester material that is effective insulation and heat reflective when expanded into position over a window or other opening.

Another object of the present invention is to provide a method and apparatus for fabricating honeycomb panels from a continuous elongated band of flexible thin film plastic material in a continuous running operation.

A further object of the present invention is to provide a method and apparatus for folding and heat setting a continuous band of flexible thin film plastic material into a tubular form with sharp, permanent ceases.

A still further object of the present invention is to provide a honeycomb cell expandable insulation panel that is neat and clean cut in appearance, is dependable, and is capable of maintaining into shape over long periods of time and through extreme heat and cold environments.

The method of the present invention includes a process of fabricating expandable honeycomb insulation panels in a continuous process of manipulating a continuous length of thin plastic film to form uniform, clean cut, neat, and effective insulation panels. It includes the steps of continuously creasing and folding the thin plastic film into an opening sided tubular structure, heat setting the folds against a surface and under constant tension in an effective, uniform manner that eliminates internal stresses that could otherwise cause warps or wrinkles, applying adhesive material to the surface of the open sided tubular structure, and continuously stacking the tubular film in layers on a flat surface or a plurality of flat surfaces to eliminate any curves that might cause wrinkles or warps in the finished product. The apparatus of the present invention provides the means to fabricate an expandable honeycomb movable insulation material according to the method described above. In particular, it includes an initial creaser assembly in which a pair of spaced-apart sharp wheels are pressed into the film to form uniformed creases along with the film material will be folded. It also includes a folding assembly to fold the lateral edges at the crease over the mid-portion thereof and a press assembly to mechanically crimp the folds. The apparatus also includes a heat setting assembly for heating the plastic film material to a sufficiently high temperature so that it looses its elasticity and becomes sufficiently plastic to permanently set the folds therein. This heat setting structure provides a uniform surface around the peripheral of a large diameter heated roller on which the folded film is pressed under constant tension to eliminate internal stresses in the material.

A drive assembly pulls the plastic film through the folding and heat setting assemblies, and a positive displacement pump feeds a liquid adhesive through an applicator for deposition onto the surface of the folded tubular plastic film. The pump is driven from the film drive assembly so that the rate of deposition of the adhesive material on the film is always in direct relation to the rate of speed in which the film moves through the apparatus in order to maintain uniform beads of adhesive for clean cut glue lines in the finished panel product. The apparatus also includes a rotatable stacking bed with flat surfaces on which successive lengths of tubular film are stacked in uniform layers one on another where they are adhered together to form the panel structures. The apparatus also includes a tension and speed control assembly for maintaining a constant tension of the film as it is stacked uniformly in layers on the rotating stacking bed.

The invention also includes the expandable honeycomb insulation panels produced according to the method and with the apparatus of this invention. It is a panel comprised of a plurality of elongated thin plastic film tubes stacked and adhered together with sharply creased edges tending to bias the tubes closed in order to maintain its sharp crisp appearance and effective insulating qualities.

BRIEF DESCRIPTION OF THE DRAWINGS

Other objects, advantages, and capabilities of the present invention will become more apparent as the description proceeds, taken in conjunction with the accompanying drawings, in which.

DETAILED DESCRIPTION OF THE PREFERRED EMBODIMENT

Figure 1:
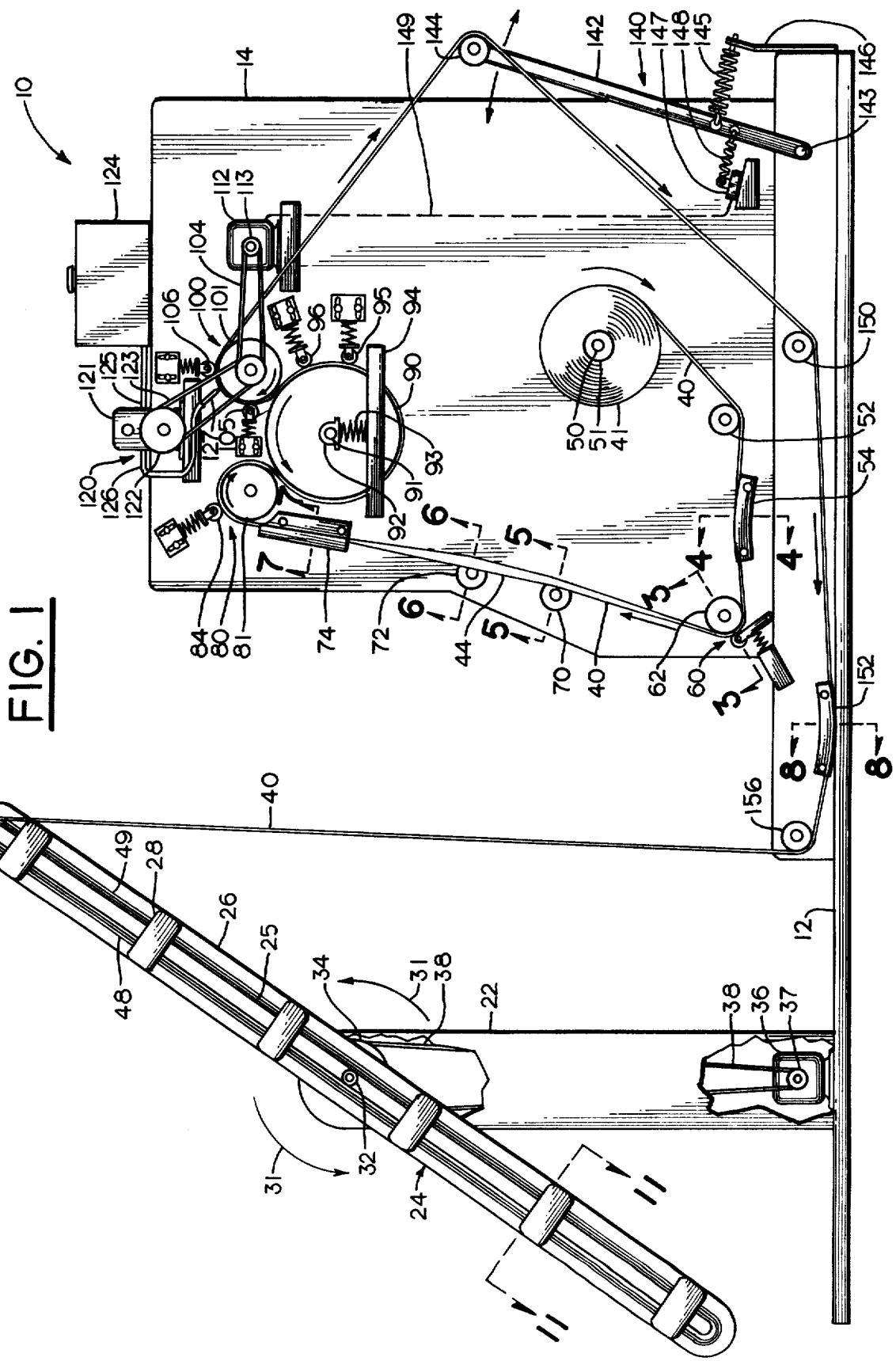
FIG. 1 is a plan view of the apparatus for fabricating honeycomb insulation material according to the present invention.
Figure 14:
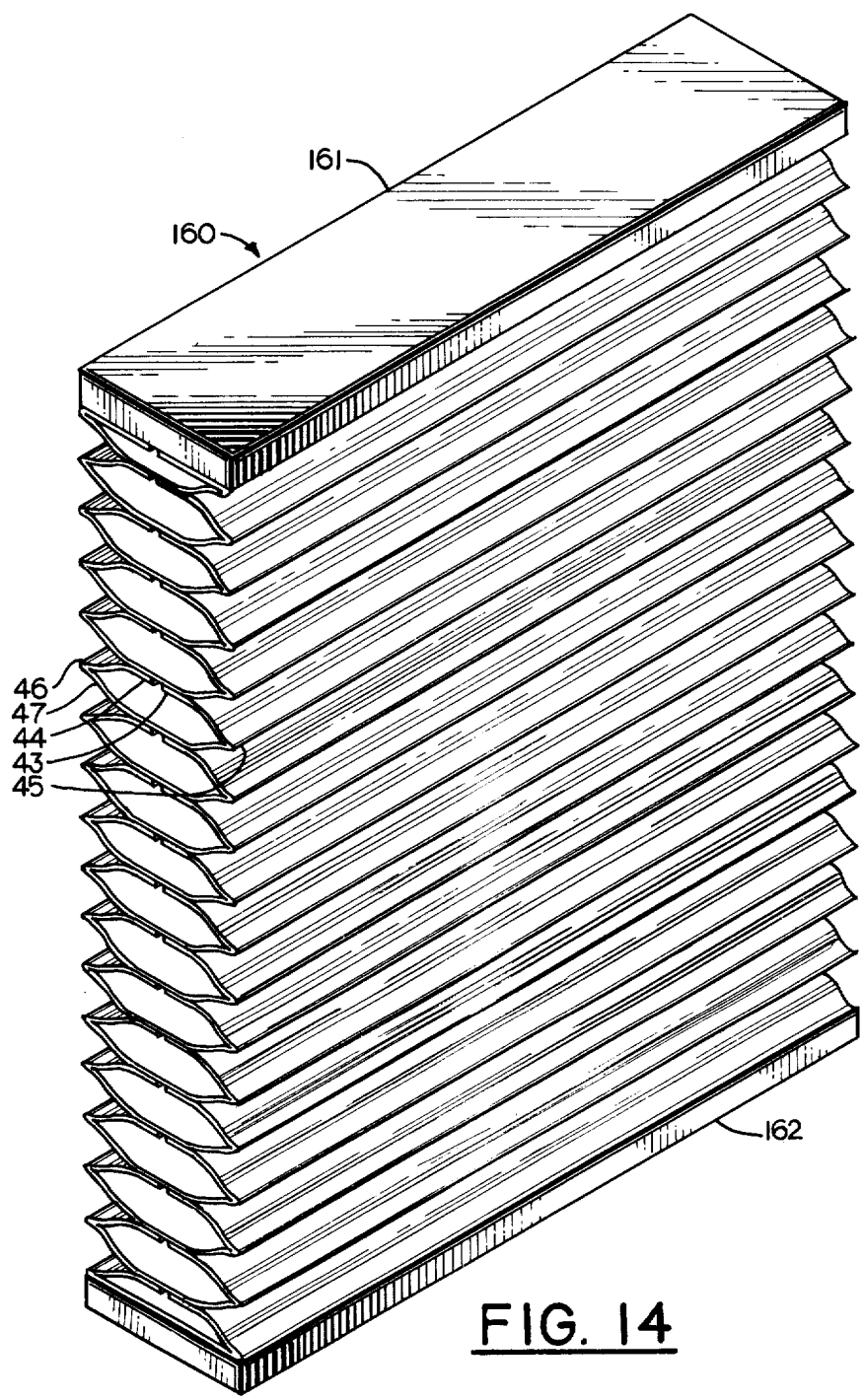
FIG. 14 is a perspective view of the honeycomb insulation material fabricated according to the present invention shown unfolded for use as an insulating material.

The apparatus for fabricating honeycomb insulation material according to the present invention is shown in FIG. 1. It is comprised of five major components designed for forming a continuous elongated strip of thin film polyester material into honeycomb movable insulation as shown in FIG. 14. The creaser assembly 60 forms an initial crease in the polyester film to facilitate folding by rollers 70, 72 and by folding channel 74. The crimper assembly 80 presses a permanent crimp in the material to form an open faced tube. The heat roller assembly 90 heats the polyester film to a pre-selected temperature for heat setting the crimp. The drive roller assembly 100 pulls the film through the preceding apparatus, and the glue applicator assembly 120 deposits metered beads of glue on the film for adhering adjacent lengths of the film to each other in laminated fashion on the stacking assembly 20. The tension and speed control assembly 140 maintains a constant tension of the film strip 40 as it is stacked on the stacking assembly 20, and it controls the speed at which the film is pulled through the preceding apparatus to conform to the film wrapping speed of the stacking assembly 10. The stacking assembly 20 is designed to continuously stack layer upon layer of the folded film 40 in equal lengths to form the panel of honeycomb insulating material shown in FIGS. 14 and 15.

The raw material utilized in this process is a continuous strip of thin film polyester plastic material or Mylar 40. A supply roll 41 of the film material 40 is mounted on a shaft 50. A slip clutch arrangement 51 allows the roll 41 to rotate for feeding out a continuous strip of film material, but only when a sufficient threshhold of tension is applied. Therefore, this slip clutch 51 sets and maintains initial tension of the film strip 40 as it is unrolled and fed through the apparatus 10.

Figure 4:
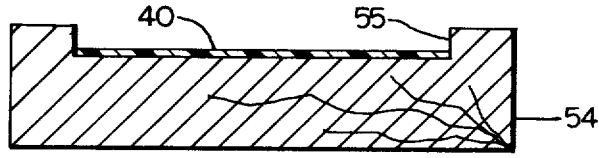
FIG. 4 is a cross-sectional view of the alignment block taken along lines 4—4 of FIG. 1.

After unrolling from the roll 41, the film strip 40 passes around a guide roller 52 and into an alignment block 54, which is effective to keep the film strip 40 in proper alignment with the initial creasing assembly 60. The alignment block 54, as shown in FIG. 4, includes a block body with a channel 55 recessed into the upper surface thereof. The channel 55 has a width approximately equal to the width of the film material 40 so that it is effective to guide the film strip 40 in proper alignment into the initial creasing assembly 60.

Figure 2:
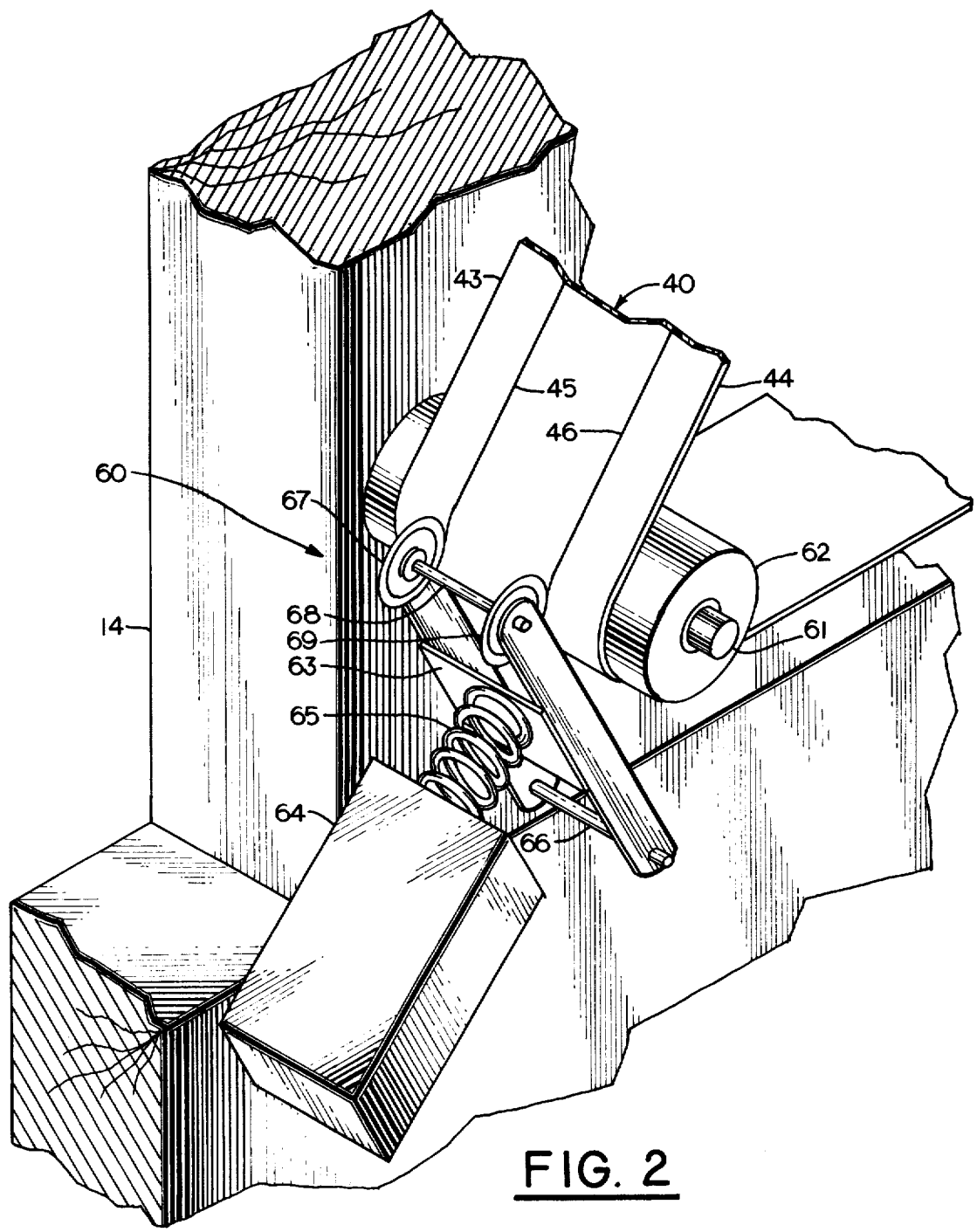
FIG. 2 is a perspective view of the initial creasing apparatus of the present invention.
Figure 3:
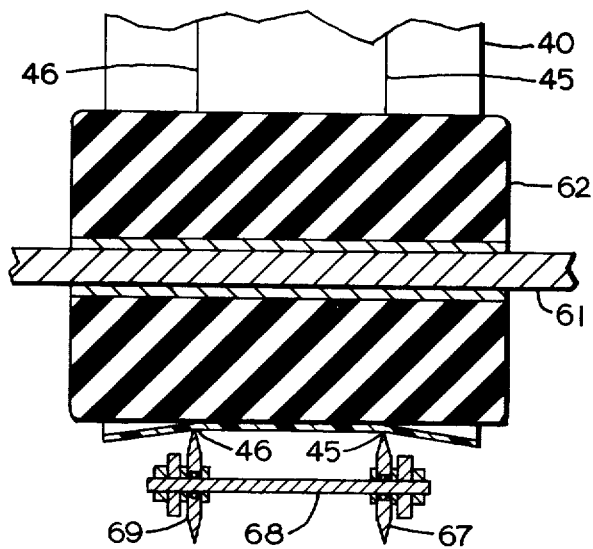
FIG. 3 is a cross-sectional view of the initial creasing apparatus taken along lines 3—3 of FIG. 1.

From the alignment block 54, the polyester film strip is positioned around the peripheral surface of a rubber surfaced backing roller 62 of the creaser assembly 60, as best shown in FIGS. 2 and 3. As the polyester film 40 moves around roller 62, a pair of creaser wheels 67, 69 press a pair of permanent creases 45, 46 in spaced-apart relation to each other in the polyester film 40.

The backing roller 62 is journaled on a shaft 61 that is mounted in the frame 14. The creaser rollers 67, 69 have sharp peripheral surfaces and are mounted in spaced-apart relation to each other on an axle 68 adjacent the peripheral surface of roller 62. The axle 68 is mounted in a pivotal arm assembly 63, which pivots about axis 66 attached to frame 14. A compression spring 65 positioned between the frame assembly 63 and anchor block 64 biases the creaser wheels 67, 69 tightly against the peripheral surface of the backing roller 62. As the film 40 passes between the peripheral surface of roller 62 and the creaser rollers 67, 69, the force exerted by spring 65 causes the creaser rollers 67, 69 to press a pair of permanent creases 45, 46 in the film 40. These creaser rollers 67, 69 are spaced such that the creases 45, 46 are formed slightly less than one-fourth the width of the film 40 inward from the respective edges. Therefor, as the lateral edge portions 43, 44 are folded over the mid-portion 47 toward each other, as will be described below, they approach but do not overlap each other.

Figure 5:
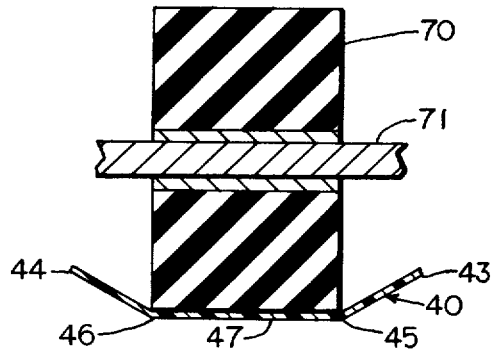
FIG. 5 is a cross-sectional view of the first folding roller taken along lines 5—5 of FIG. 1.
Figure 6:
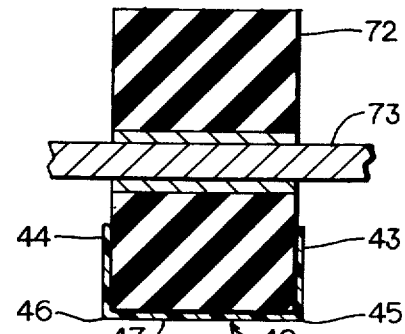
FIG. 6 is a cross-sectional view of the second folding roller taken along lines 6—6 of FIG. 1.

From the creaser assembly 60, the film 40 passes around two folding rollers 70, 72 mounted on the frame 14. As best seen in FIGS. 1, 5, and 6, these folding rollers are positioned offset from a straight line between the creaser roller 62 and a folding block 74. In this offset relation, the film 40 must pass through a slight curve of approximately fifteen degrees around the folding rollers 70, 72. The pressure of the rollers 70, 72 in combination with the curve through which the film 40 passes and the creases 45, 46 formed in the film 40, causes lateral edge portions 43, 44 to fold upwardly as shown in FIGS. 5 and 6 around the lateral sides of the rollers 70, 72. The first roller 70 causes the lateral edges 43, 44 to begin folding upwardly out of the straight line relationship mid-section 47. The roller 72 causes a further folding of the outer edge portions 43, 44 to nearly a right angle relation to the mid-portion 47. The curve mentioned above around rollers 70, 72 is necessary to make the distance which the center or mid-portion 47 travels equal to the distance travelled by the lateral edge portions 43, 44, which must fold up and back down again over the mid-portion 47.

Figure 7:
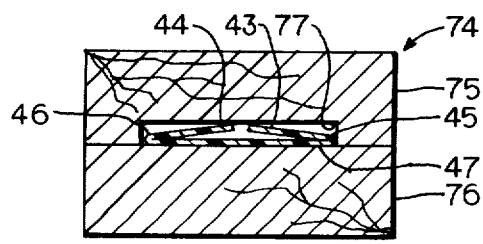
FIG. 7 is a cross-sectional view of the folding track taken along lines 7—7 of FIG. 1.
Figure 8:
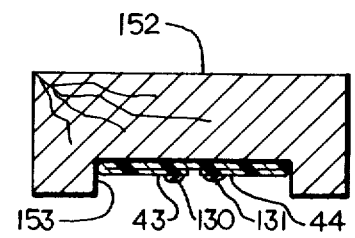
FIG. 8 is a cross-sectional view of the final alignment block taken along lines 8—8 of FIG. 1.

As the film proceeds from the last folding roller 72, it enters the folding channel 74 to complete the fold as best shown in FIG. 7. The folding channel 74 is comprised of two block portions 75, 76 positioned adjacent to each other. The block portion 75 has a channel 77 formed therein so that when it is placed adjacent block 76, it forms an enclosed slot of a width approximately equal to the width of the mid-portion 47 of film 40. The height of the slot is less than the width of the lateral edge portions 43, 44. Therefore, this channel or slot 77 causes the lateral end portions 43, 44 to fold over on top of the mid-portion 47 to form the open tube or cell structure of the honeycomb insulation material according to this invention.

Figure 9:
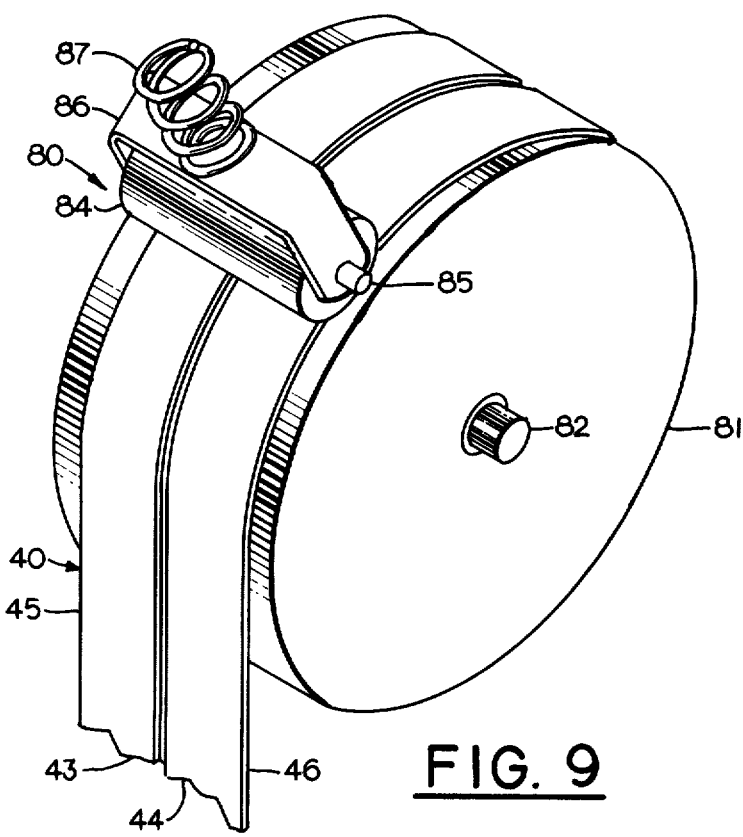
FIG. 9 is a perspective view of the first crimper assembly.

As the film 40 leaves the folding channel 74, it passes through the first crimper assembly 80. The first crimper assembly 80 is comprised of a large roller 81 journaled to rotate on a shaft 82. The film 40 passes around the peripheral surface of the roller 81 as best shown in FIG. 9. A crimp roller 84 is positioned adjacent the peripheral surface of roller 81 and is journaled to roll on an axke 85 mounted in a frame 86. A compression spring 87 biases the roller 84 tightly onto the peripheral surface of roller 81. Therefor, as the film 40 passes between the crimp roller 84 and the peripheral surface of roller 81, it is tightly pressed and squeezed to form a permanent fold in the film 40 along the crease lines 45, 46. Therefor, the open tube form of the polyester film strip 40 as shown in FIG. 9 is more or less permanently set.

Even though the crimper 80 sets the fold in the polyester film along the crease lines, the original bias of the molecular structure of the polyester material to a flat plane tends to cause the creases or bends to round out or sag over a long period of time. Such rounding out or sagging can be detrimental to the appearance of the insulation panel and can interfere with its functional operations. The only way to permanently set the fold in a sharp crimp or bend is to heat the polyester material to the point where it substantially looses its elasticity and becomes sufficiently plastic to re-orient the molecular structure along the bends to conform with the sharp crimps. Therefor, the polyester film is passed around the peripheral surface of a large diameter heated roller where it is heated to approximately 350 degrees F. As the polyester film material is heated against the cylindrical peripheral surface of the roller 90 under the slight tension in the operating system, the molecular structure of the polyester material rearranges to permanently set the crease.

In order to avoid ripples and other undesirable effects that can result from internal stresses due to uneven heating, it is necessary to apply the heat evenly and uniformly across the entire width of the polyester film. Merely heating along the edges or along the creases will usually cause internal stresses that result in warps or wrinkles, which is avoided by the uniform heating of the film on a large radius surface under constant tension according to this invention.

While the polyester material is hot, press rollers 95 and 96 apply a rolling pressure across the entire width of the film to set the bend or crimp permanently at a sharp angle. These press rollers 95, 96 are similar to the press roller 84 shown in FIG. 9. Also, the heated roller 90 has a biased mount which applies an upward pressure to press the peripheral surface of the wheel 90 against the peripheral surface of the roller 81 of the crimper assembly and against the peripheral surface of roller 101 of the drive assembly. As the film 40 passes between the respective peripheral surfaces of these rollers, the pressure thereon is also effective to help set the permanent crease.

After the film leaves contact with the peripheral surface of the heated roller 90, it travels around the peripheral surface of drive roller 101. Drive roller 101 is cooled so that it is effective to lower the temperature of the film below its plastic point so that it again attains its elasticity with the bends or creases 43, 44 permanently set. Additional press rollers 105 and 106 presses the film 40 against the peripheral surface of drive roller 101 and help to maintain the sharp bend or crimp in the film as the film cools down.

Figure 10:
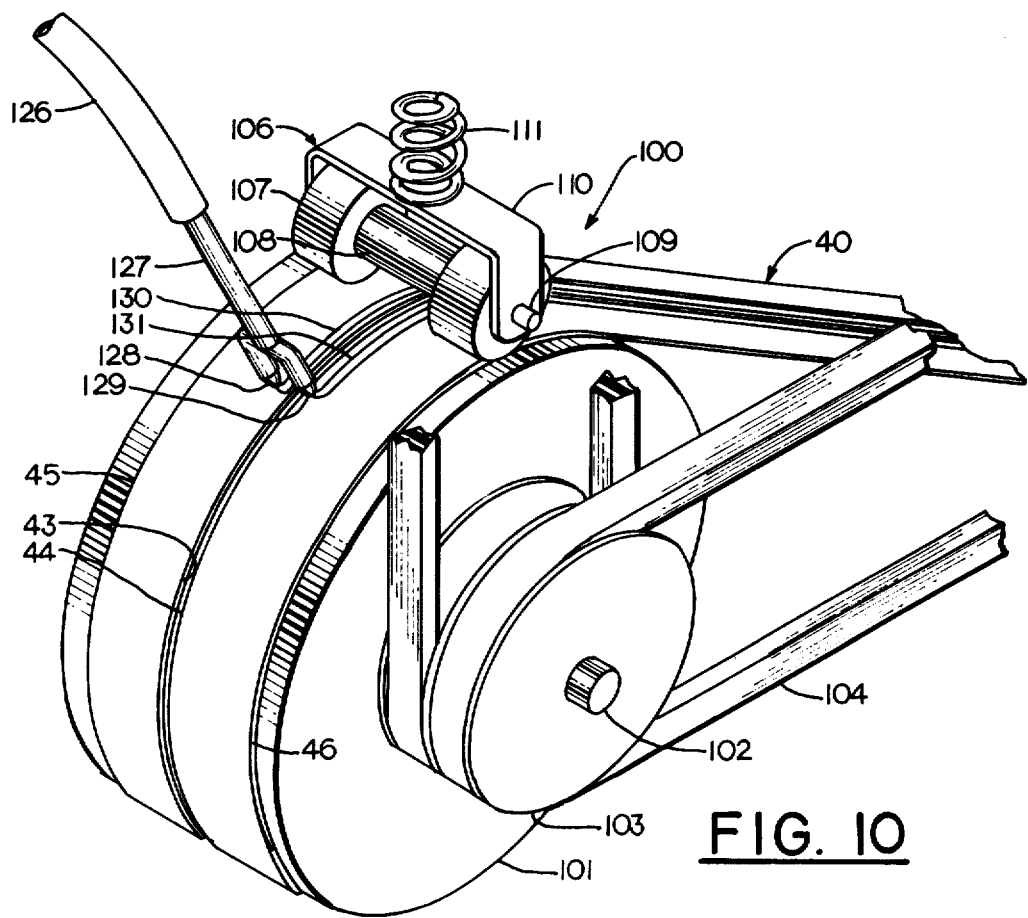
FIG. 10 is a perspective view of the film drive wheel and adhesive applicator assembly.

As mentioned above, the drive roller 101 not only is effective to cool the film 40, but it is also used to pull the film 40 through the bending and heat setting apparatus. As best seen in FIGS. 1 and 10, A motor 112 has mounted thereon a belt pulley 113, and a drive belt 104 passes around the belt pulley 113 and around double pulley 103 which is connected to the drive roller 101. The drive roller 101 is journaled on a shaft 102 so that the motor 112 and drive belt 104 are effective to rotate the drive roller 101. The press rollers 105, 106, in addition to holding the crease as the film 40 cools as described above, also apply pressure to press the film 40 against the cylindrical peripheral surface of the drive roller 101 to provide the traction necesary for pulling the film 40 through the apparatus.

Figure 15:
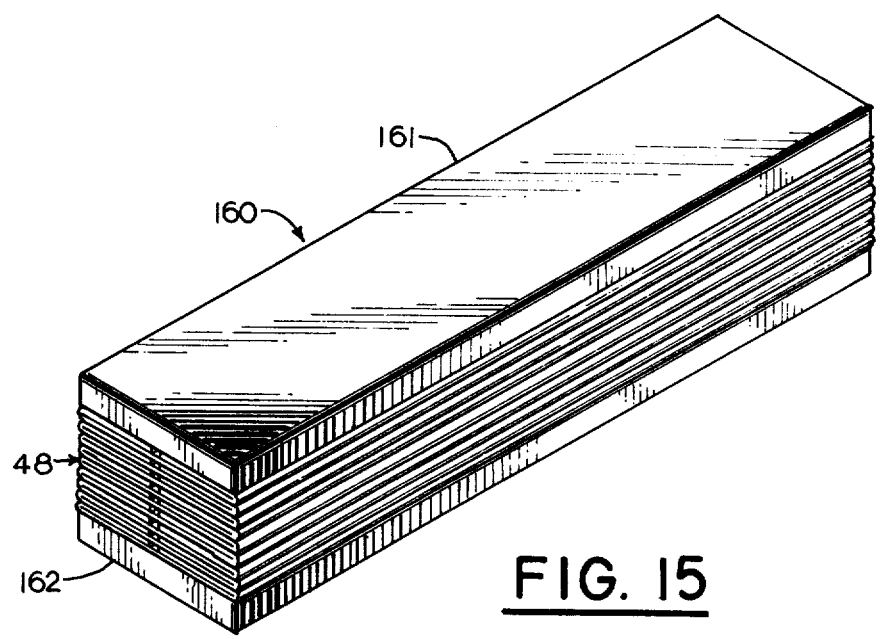
FIG. 15 is a perspective view of the honeycomb insulation material fabricated according to the present invention shown in its collapsed state.

The adhesive applicator assembly 120 is used to apply a liquid adhesive material, such as a glue, to the surface of the film 40 for adhering adjacent lengths of the film 40 together in the honeycomb panel structure shown in FIGS. 14 and 15. The glue applicator assembly 120 includes a positive displacement gear pump 121, which is effective to disperse glue in direct proportion to the rotational speed of the pump. The pump is driven by a belt 123, which passes around the double pulley 103 on the drive roller 101 and around the pump pulley 122 on the main shaft of the pump. Therefor, the pump 121 rotates at a speed directly proportional to the speed of rotation of the drive roller 101, thus proportional to the linear speed of the film 40 passing through the apparatus. The pump 121 draws the liquid adhesive from a reservoir 124 through a suction tube 125 and discharges it at a rate directly proportional to the rotational speed of the pump through a discharge line 126 to the glue applicator 127, which is positioned directly over the film 40 as it passes around the peripheral surface of the drive wheel 101. As best seen in FIG. 10, the glue applicator 127 has two spaced-apart nozzles 128, 129 positioned on opposite sides of the gap in the film between adjacent edge portions 43, 44. Therefor, as the film 40 passes over the peripheral surface of drive roller 101, the glue applicator 127 discharges two uniform beads of glue 130, 131 on the edge portions 43, 44 adjacent the gap therebetween. If the drive roller is speeded up to increase the speed of the film passing through the apparatus, the pump 21 pumps proportionally more glue so that there are always two uniform beads of glue 130, 131 deposited on the film. The press roller assembly 106 is constructed with a roller 107 having a recessed portion 108 therein to allow the glue beads 130, 131 to pass undisturbed thereunder. The roller 107 is journaled on an axle 109 which is mounted in a frame 110. The spring 111 biases the roller 107 against the film 40 on the peripheral surface of roller 101.

After the film 40 passes over the drive roller 101, it proceeds to the tension and speed control assembly 140. The tension and speed control assembly 140 is comprised of a dancer arm 142 pivotally mounted on a pin 143, a tightener roller 144 on the distal end of the dancer arm 142, a tension spring 145 connected to the dancer arm 142, and a reostat 147. This tension and speed control assembly 120 is necessary to maintain a constant tension of the film 40 between the drive roller 101 and the stacking arm 124, as will be described more fully below.

Figure 11:
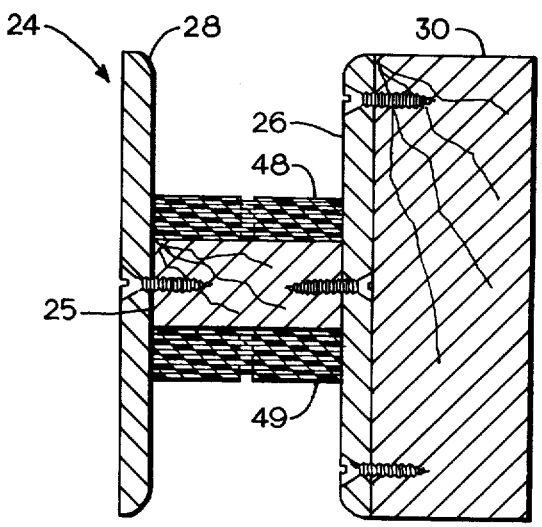
FIG. 11 is a cross-sectional view of the stacking arm taken along lines 11—11 of FIG. 1.

As the stacking arm 24 rotates in the angular direction indicated by the arrows 31, it takes up and winds around itself the film 40 in successive lengths approximately equal to the length of the stacking bed 25. As shown in FIG. 1, two stacks 48, 49 of the film 40 are deposited in layers on opposite flat surfaces of the stacking bed 25. As also shown in FIG. 11, the stack bed 25 is of a width approximately equal to the width of the film 40, and the front guides 28 guide the film 40 in a uniform manner onto the stacking bed 25 between the front guides 28 and back side plate 26. A rigid support arm 30 is fastened to the back side plate 26 to give the stacking arm structural rigidity to remain flat throughout its entire length.

As an end of the stacking arm 24 approaches the guide roller 156, the velocity of the film 40 drawn through the alignment block 152 and around guide roller 156 decreases significantly. When both ends of the stacking arm 24 are in a straight line relation with the guide roller 156, the velocity of the film 40 traveling around roller 156 momentarily decreases to zero. However, as the rotation of the stacking arm 24 continues and approaches a right angle relationship to a line extending between guide roller 156 and main shaft 32, the velocity of the film 40 drawn through the alignment block 152 and around guide roller 156 increases significantly. Therefor, there are two cycles of alternate increasing and decreasing velocity of the film 40 for every revolution of the stacking arm 24.

The tension and speed assembly 140 is effective to maintain a constant tension on the film 40 being wrapped around the stacking bed 25. It also controls the speed at which the motor 112 draws the film 40 through the folding, heating setting, and glue applicator assemblies. For example, as an end of the stacking arm 24 approaches the guide roller 156 and the velocity of the film 40 decreases, the spring 145 pulls arm 142 and tightener roller 144 in a direction away from the stacking assembly 20 to take up the slack in the film 40 and to maintain a constant tension thereon. At the same time, in order to keep from having too much film 40 delivered from the heat setting assembly 90, the spring connection 148 between dancer arm 142 and reostat 147 is effective to adjust the rheostat 147 to slow down the speed of the motor 112. Therefore, the rate at which the film 40 is pulled through the folding, heat setting, and glue assemblies is also slowed, and the positive displacement gear pump 121 of the glue applicator assembly 120 decreases proportionately the amount of glue applied to the surface of the film 40. Alternately, as the stacking arm 24 continues to rotate and its ends move away from the guide roller 156, it draws the film 40 at a greater velocity. As the increased rate of draw decreases the slack of the film 40 that was taken up by the tightener roller 144, it draws the tightener roller 144 and dancer arm 142 toward the stacking assembly, still under a constant tension applied by the spring 145. However, in order to make up the lost slack the rheostat 147 is automatically adjusted again to speed up the motor 112 to feed the film 40 through the folding, heat setting, and glue applicator assemblies at a faster rate. In this manner, there is always a sufficient length of film 140 available at a constant tension to be stacked on the stacking arm 24, regardless of the wide ranging variation in velocity at which the film 40 is drawn by the stacking assembly 20.

Figure 12:
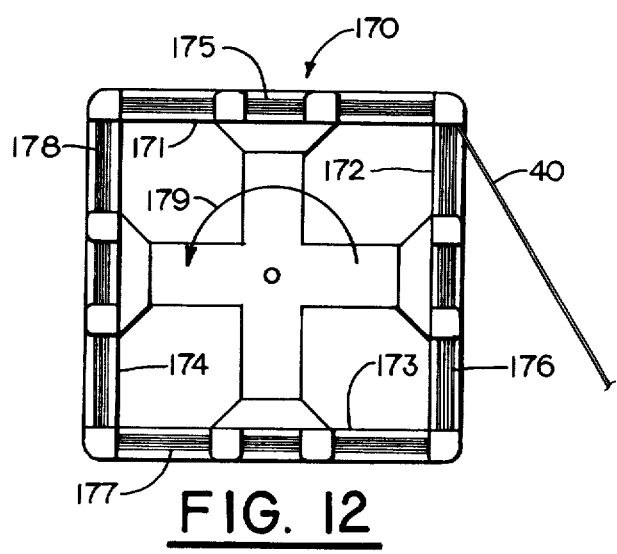
FIG. 12 is an elevation view of an alternative embodiment stacking assembly.
Figure 13:
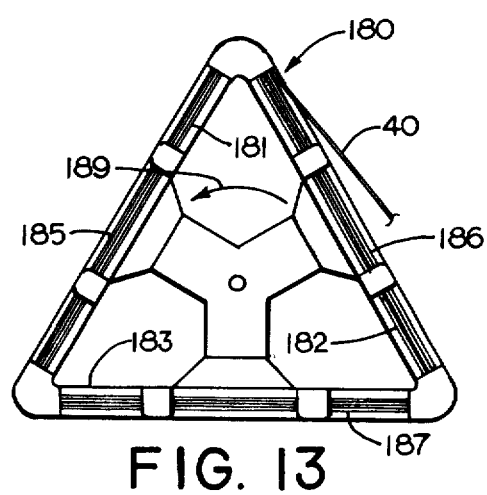
FIG. 13 is an elevation view of another form of stacking assembly according to the present invention.

Although the preferred embodiment shown in FIG. 1 includes an elongated, basically one-dimensional linear stacking arm 24 with two flat surfaces on opposite sides of an elongated stacking bed 25, any configuration of stacking arm will work as long as it has at least one flat side on which to stack a panel of adjacent straight tubular film layers one or another. For example, a square embodiment of a stacking reel 170 is shown in FIG. 12. This square embodiment 170 has four elongated flat stacking beds 171, 172, 173, 174 on which are stacked simultaneously four stacks of tubular film layers 175, 176, 177, 178 as it rotates in the angular direction indicated by arrow 179. Another variation is the triangular embodiment 180, which has three elongated flat stacking beds 181, 182, 183. Therefore, three stacks of tubular film layers 185, 186, 187 can be formed simultaneously as the triangular reel 180 rotates in the angular direction indicated by arrow 189.

In order to complete the construction of the expandable and contractable honeycomb panels as shown in FIGS. 14 and 15, a stack on a flat side of a stacking bed is cut away from the rounded end sections and removed from the stacking bed. The removed section of the stack is therefore comprised of a plurality of straight, unwrinkled tubular film structures laminated and adhered together one on another in a neat, clean cut expandable panel 160, as shown in FIGS. 14 and 15. In order to give the panel structural rigidity, a top slat 161 can be adhered to the top tubular film, and a rigid bottom slat 162 can be adhered to the bottom tubular film. The preferred form is with the top and bottom slats 161, 162 being at least as wide as the honeycomb panel as shown in FIGS. 14 and 15 with the adjacent tubular film structures adhered to the slats across that entire width.

In this completed form, the honeycomb or movable insulation assembly 60 can be expanded to cover a desired section of wall, window, opening or the like as shown in FIG. 14, or it can be retracted to as shown in FIG. 15. The final construction of the panel 160 is best seen in FIG. 14 wherein the lateral edges 43, 44 are adhered to the outside surface of the mid-portion 48 of the next adjacent tubular film. The sharply creased folds 45, 46 tend to bias the lateral edge portions 43, 44 toward the mid-portion or bottom portion 47. This bias tends to partially close the honeycomb cells or at least not allow them to be stretched fully open under the normal weight of the panel. Therefore, the panel hangs naturally in approximately the configuration shown in FIG. 14 in which it is effective to cover and insulate a wall, window, or the like while maintaining its neat, clean cut, attractive appearance and functional utility.

It is significant to note that expandable and contractable honeycomb insulation panels constructed according to the method of this invention are neat in appearance, clean cut, and have virtually no visable warps or wrinkles. These very desirable attributes are a result of the sharp uniform creases and folds applied by this method and where the folds are heat set under a constant tension on a surface uniformly across the entire film width as disclosed herein. In order to eliminate internal stresses in the polyester plastic material, it is important that the entire width of the film be heated uniformly and cooled uniformly during the heat setting process. It is also important that the adhesive material be applied uniformly and in direct proportion to the speed at which the film 40 is fed through the folding and heat setting apparatus in order to maintain uniform and neat appearing glue lines.

It should be mentioned that this process has also been used successfully by applying double sided contact tape as the adhesive material instead of a liquid adhesive such as the glue described herein to adhere the adjacent tubular film structures together. Further, the method described herein of continuously wrapping the tubular film 40 around a stacking arm or reel having at least one flat stacking surface thereon also is effective to maintain the neat, sharp appearance of the finished panel with no undesirable wrinkles or warps in any of the tubular film sections therein that often result from stacking individual lengths of tubes or from revolving a continuous roll of tubes around rollers. In summary, it has been found that the fabrication of expandable and contractable honeycomb panels for insulation and the like according to this invention produces a much neater and more effective insulation panel product than any of the prior art products or processes.

While the present invention has been described with some degree of particularity, it should be appreciated that the present invention is defined by the following claims construed in light of the prior art so that modifications or changes may be made to the preferred embodiment of the present invention without departing from the inventive concepts contained herein.

What I claim is:

1. The method of fabricating expandable honeycomb material, comprising the steps of:

continuously folding a continuous length of tubular material at diametrically opposite sides into a flat tubular form passing said length of tubular material over a heated surface and heating the tubular material uniformly across its entire transverse cross section and then passing said length of tubular material over a cold surface and cooling the tubular material uniformly across its entire transverse cross section, while continuously maintaining a uniform tension on said tubular material as it passes over the heated and cold surfaces and while maintaining the folds during heating and cooling by pressing a plurality of rollers against the folded tubular material on said heated and cold surfaces;

applying an adhesive material longitudinally along the length of said folded tubular material;

stacking the continuous length of tubular material on a rack that has an elongated flat surface in such a manner that the tubular material is stacked on the flat surfaces in a plurality of adjacent layers one on another with the adhesive material positioned between each layer;

allowing the adhesive material to adhere one layer to another to form a unitary stack on said flat surface; and cutting a straight section of the unitary stack on the flat surface away from the remainder of the stacked tubular material and removing it from the rack.

2. The method of claim 1, including the step of stacking the tubular material on the flat surface by continuously wrapping the strip of tubular material around the rack and over the flat surface.

3. The method of claim 2, including the step of rotating the rack in a plane common to the strip of tubular material to continuously wrap the tubular material around said rack.

4. The method of claim 3, including the step of maintaining a uniform tension on the strip of tubular material as it is wrapped around said rack.

5. The method of claim 1, including the step of forming a continuous elongated strip of flat, single layer material into the tubular configuration.

6. The method of claim 5, including the step of folding the lateral edges of the flat strip of material over the midportion of the strip toward each other as the strip moves toward the rack.

7. The method of claim 6, including the step of creasing the flat strip in longitudinally parallel lines along the length of the strip to facilitate initial folding of the lateral edges.

8. The method of claim 7, including the step of creasing said flat strip by pressing a pair of spaced-apart rollers having sharp peripheral surfaces onto said flat strip with sufficient pressure to crease the material.

9. The method of claim 8, including the step of fabricating said tubular structure from a continuous elongated flat strip of polyester film.

10. The method of claim 9, including the step of permanently setting said folds by heating the polyester film material to a temperature sufficiently high to cause the polyester material to lose its elasticity and to become plastic while maintaining the folds in the material such the molecular structure of the polyester material forms in the shape of the bend and cooling the polyester material while maintaining the folds to regain elasticity with the folds in place.

11. The method of claim 10, including the step of heating the polyester strip by passing it over a cylindrical peripheral surface of a hot roller.

12. The method of claim 11, including the step of cooling the polyester strip by passing it over a cylindrical peripheral surface of a cool roller.

13. The method of claim 4 or 12, including the steps of passing the strip of tubular material around a guide roller mounted on a pivotal dancer arm adapted to allow the guide roller to move toward and away from the rack in a common plane with the strip of material, and maintaining a bias on said roller directed away from said rack to maintain a constant tension on the strip of tubular material as it is stacked on the rack.

14. The method of claim 13, including the step of driving said strip of tubular material toward said rack at a speed sufficient to maintain said dancer arm within its biased pivotal range.

15. The method of claim 14, including the step of varying the drive speed rate of said strip toward said rack in relation to the position of said dancer arm such that shortening of the available strip for stacking on said rack pulls the dancer arm toward the rack and cause the drive speed to increase to feed more strip material toward the rack, and lengthening of the available strip for stacking on said rack allows the dancer arm to pivot away from the rack and causes the drive speed to decrease to feed less strip material toward the rack.

16. The method of claim 15, including the step of applying liquid adhesive to the strip of tubular material in direct proportion to the speed at which the strip is fed toward the rack.

17. A honeycomb expandable panel fabricated by the process comprising the steps of:
continuously creasing and folding the lateral edge portions of a flat flexible plastic film toward each other over the midportion thereof;
continuously heat setting the folds in the film by heating the film over its entire width by pressing the film in contact with a heated surface, then cooling the film, and during the heating and cooling steps, maintaining a constant longitudinal tension on the film as well as a constant lateral crimping pressure on the folds in the film;
continuously applying adhesive material to an external surface of the folded film, continuously winding the folded film under a constant tension around a rack having an elongated flat surface thereon in such a manner that successive loops of the film around the rack are placed uniformly one over another, allowing the adhesive material to adhere portions of the outside surfaces of adjacent layers of the film together, and cutting the portion of the stack positioned on the flat surface away from the remaining portions of the stack.

18. The expandable panel of claim 17, fabricated by the further steps of continuously pressing parallel, spaced-apart crease lines in the film to define the fold lines and pressure crimping the folds along the crease line to form sharp, clearly defined folds prior to heat setting the folds in the film.

19. The expandable panel of claim 18, fabricated by the further steps of creasing and folding the film in such a manner that the lateral edge portions are folded over the mid-portion by a width causing the edge portions to approach nearly but not overlap each other, and applying the adhesive material to the external surfaces of the respective folded lateral edge portions of each tubular folded film length stacked on the flat surface is adhered to the mid-section of the adjacent folded film length while the individual lengths of tubular film are free to open and close as the panel is extended and retracted.

20. A honeycomb expandable panel fabricated by the process comprising the steps of creasing and folding the lateral edge portions of a flat flexible plastic film in such a manner that the lateral edge portions are folded over the mid-portion buy a width causing the edge portions to approach nearly but not overlap each other, and applying adhesive material to the external surfaces of the respective folded lateral edge portions, stacking successive lengths of the folded film in layers on a flat surface such that the lateral edge portions of each tubular folded film length stacked on the flat surface is adhered to the mid-section of the adjacent folded film length while the individual lengths of tubular film are free to open and close as the panel is extended and retracted.

* * * * *